(12) United States Patent
Koch et al.

(10) Patent No.: US 7,382,843 B2
(45) Date of Patent: Jun. 3, 2008

(54) SYSTEM WITH A CLOCKED INTERFACE

(75) Inventors: Stephan Koch, Zürich (CH); Gerd Jakob Ernst Scheller, Kilchberg (CH); Rolf Friedrich Philipp Becker, Adliswil (CH)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 10/498,143

(22) PCT Filed: Dec. 9, 2002

(86) PCT No.: PCT/IB02/05275

§ 371 (c)(1),
(2), (4) Date: Dec. 20, 2004

(87) PCT Pub. No.: WO03/050941

PCT Pub. Date: Jun. 19, 2003

(65) Prior Publication Data

US 2005/0105628 A1    May 19, 2005

(30) Foreign Application Priority Data

Dec. 11, 2001    (EP)    ................................ 01204834

(51) Int. Cl.
*H04L 7/00*    (2006.01)
(52) U.S. Cl. .................................................... 375/354
(58) Field of Classification Search ................ 375/259, 375/219, 214, 257, 354, 355
See application file for complete search history.

(56) References Cited

U.S. PATENT DOCUMENTS

| | | | | |
|---|---|---|---|---|
| 4,021,740 A | | 5/1977 | Horna | |
| 4,393,516 A | * | 7/1983 | Itani | 398/154 |
| 4,736,394 A | * | 4/1988 | Giovannelli et al. | 375/220 |
| 5,281,861 A | * | 1/1994 | Tran et al. | 327/141 |
| 5,576,706 A | * | 11/1996 | Daigle et al. | 341/22 |
| 5,656,961 A | * | 8/1997 | Tran et al. | 327/184 |
| 5,769,876 A | * | 6/1998 | Silvian | 607/60 |
| 6,463,092 B1 | * | 10/2002 | Kim et al. | 375/219 |
| 6,816,987 B1 | * | 11/2004 | Olson et al. | 714/704 |
| 6,934,775 B2 | * | 8/2005 | Peller et al. | 710/36 |
| 7,058,133 B2 | * | 6/2006 | Menzl | 375/259 |
| 2001/0046266 A1 | * | 11/2001 | Rakib et al. | 375/259 |
| 2002/0181608 A1 | * | 12/2002 | Kim et al. | 375/295 |
| 2004/0013203 A1 | * | 1/2004 | Roy et al. | 375/259 |

FOREIGN PATENT DOCUMENTS

EP    0 486 072 A2    5/1992

\* cited by examiner

*Primary Examiner*—Young T. Tse
(74) *Attorney, Agent, or Firm*—Peter Zawilski

(57) ABSTRACT

A system with a transmitter for transmitting digital data via an interface to a receiver. The interface has at least one data line and a clock line. A clock generator supplies a clock signal to the clock line. The receiver uses the clock signal received from the clock line for deriving timing information for processing received digital data. The clock signal may have an amplitude that is lower than the power supply voltage VDD, typically less than half of the power supply voltage, and less stringent requirements can be applied to the waveform of the clock signal than traditionally applied to data and clock signals. The clock signals are hereby less power consuming and cause significantly less electromagnetic interference.

14 Claims, 2 Drawing Sheets

SYSTEM WITH A CLOCKED INTERFACE

The invention relates to digital systems with one or more units communicating digital data via an interface, where the interface has one or more data lines for transmitting digital data and a clock line transmitting clock signals with timing information for use by a receiver receiving the digital data from the interface.

Conventional synchronous high-speed serial bus systems require a clock signal, whenever an exchange of digital data between a data transmitter and a data receiver is done over the interface. The clock signals used in such systems are square wave signals with an amplitude substantially equal to the power supply voltage VDD of the system.

Such square wave clock signals are power consuming, and they contain a substantial amount of harmonic frequencies due to the square waveform of the clock signal. The harmonic frequencies may cause disturbances due to electromagnetic interference (EMI), and measures have to be taken in order to protect sensitive equipment and components against EMI.

U.S. Pat. No. 4,021,740 discloses a sine wave clock distribution network, i.e. a sine wave system clock. The sine wave system clock is connected through a branching network to a plurality of clock drivers located in the vicinity of digital circuits to which clock pulses are to be supplied.

A typical known system is illustrated in FIG. 1, where a master integrated circuit (IC) transmits digital data over a serial interface, and a slave IC receives the data transmitted by the master IC. A system clock signal is supplied both to the master IC and to the slave IC, and in both integrated circuits the received clock signal is processed or regenerated to have suitable properties for use in the respective integrated circuit. The system clock signal can thus be any appropriate signal such as a square wave or a sine wave, and each of the integrated circuits performs its own processing of the system clock signal. In the master IC the serial interface receives the processed clock signal and transmits the processed clock signal on a clock line with timing information for use by the slave IC. The slave IC receives the clock signal together with the digital data from the master IC. It is seen that the slave IC receives two clock signals, the system clock signal and the clock signal from the master IC. This requires at least one pin on the integrated circuit for each clock signal. Furthermore, and traditionally, the clock signal transmitted from the master IC to the slave IC is a square wave signal with an amplitude substantially equal to the power supply voltage VDD of the system, which may cause disturbances due to electromagnetic interference (EMI).

It is the object of the invention to provide a system, which is less susceptible of causing disturbances due to EMI. It is also an object of the invention to provide a system with less power dissipation. Another object of the invention is to provide a system, which requires less input terminals or pins on the integrated circuits of the system.

These objects are achieved by a system according to the invention, in which the receiver uses the clock signal received from the clock line for deriving timing information for processing received digital data.

Figure 1:
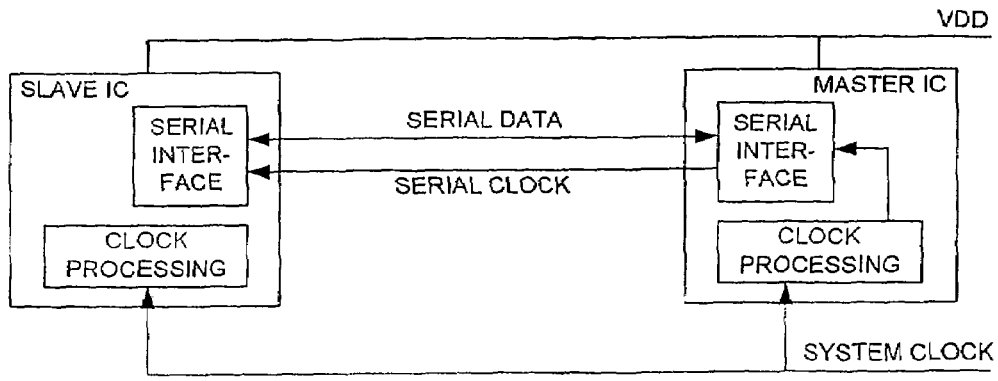
FIG. 1 shows a prior art system.
Figure 2:
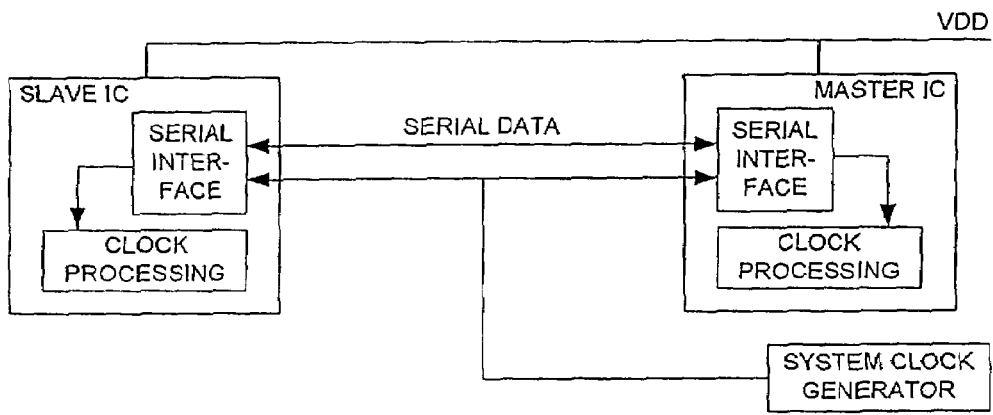
FIG. 2 shows schematically one preferred embodiment of the invention.

FIG. 2 shows a system with a master integrated circuit (IC) and a slave integrated circuit (IC). A communication bus with at least one serial data line and a clock line interconnects the master IC and the slave IC. The slave IC and the master IC exchange digital data over the data line. The exchange of data can be unidirectional from the master IC as data transmitter to the slave IC as data receiver only, or it can be bi-directional with either IC as transmitter and the other IC as receiver. A system clock generator generates a system clock signal, which is supplied to the clock line of the interface bus, and both the master IC and the slave IC receive the system clock signal. The master IC and the slave IC both receive a power supply voltage VDD. As shown, the power supply voltage VDD can be supplied from a common source, or it can be supplied from different sources. As in the prior art system of FIG. 1, the system clock supplied to the clock line of the interface bus can be a sine wave signal or any stable periodic signal with a fundamental frequency of the desired clock frequency. Here, the system clock signal alternates between two voltage levels with a difference smaller than the power supply voltage VDD, preferably less than half thereof.

Such clock signals are here referred to as "low swing" signals, which include all signals, which change state at levels, which are lower than the supply voltage VDD of the circuit they are connected to. In order to use this low swing signal, the integrated circuits need to regenerate the signal by amplification and re-shaping. A typical low swing signal can be a sinusoidal wave, which has an amplitude of VDD/2.

As opposed to "low swing" signals, "full swing" refers to a signal, which toggles (=changes state) at the same level as supply voltage of the circuit it is attached to. A typical full swing signal is a square wave with amplitude VDD—the edges of such a signal are steep and are susceptible of producing noise in the system through EMI.

Figure 3:
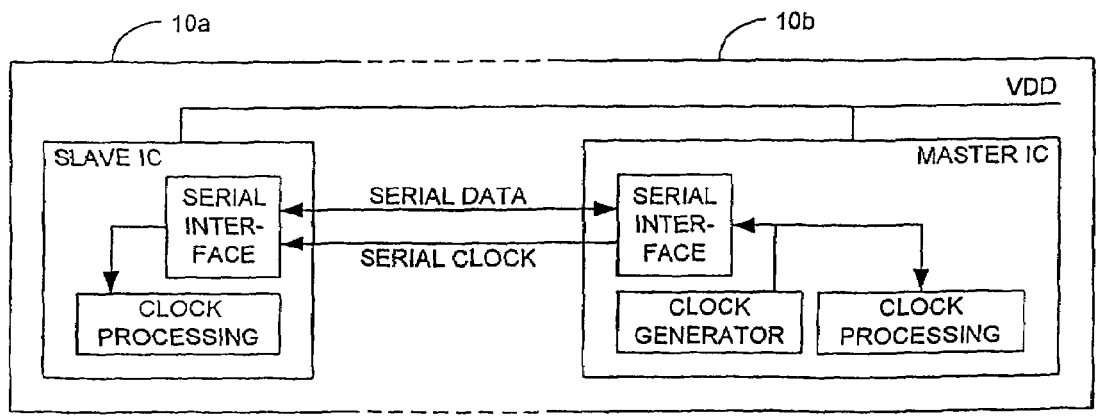
FIG. 3 shows schematically another preferred embodiment of the invention.

FIG. 3 shows another embodiment of the invention. In contrast to the embodiment in FIG. 2, the system in FIG. 3 does not utilize a system clock generator but a clock generator internal to the master IC. The internal clock generator generates a clock signal, which can be a "low swing" clock signal. The clock signal from the internal clock generator is supplied to a clock processing circuit to be regenerated for further use in the master IC, and to a serial interface in the master IC. The slave IC is in all relevant aspects identical to the slave IC in FIG. 2, and the exchange of data can be unidirectional from the master IC to the slave IC only or bi-directional. In this embodiment the clock signal is transmitted as a "low swing" clock signal from the master IC, via the clock line of the bus, to the slave IC, which receives both the clock signal and digital data signals via the data line of the bus. Like in FIG. 2, the master IC and the slave IC are both powered by a supply voltage VDD, which may originate from a common power supply or from different power supplies.

The transmitting master IC and the receiving slave IC can be mounted on one printed circuit board or on different printed circuit boards. The different circuit boards can be in one and the same apparatus with a common housing, or they can be in different apparatuses placed close together or any distance apart. In any case there will have to be a data communication link between the transmitter and the receiver. The data communication link can be a cable, a wireless link or any suitable link over the actual distance. In FIG. 3 a frame 10a, 10b indicates this fact. Part of the frame is shown in broken lines indicating that the integrated circuits can be mounted on one or two circuit boards any distance apart. Although not shown, the same applies to the systems in FIGS. 2 and 4 as well.

Figure 4:
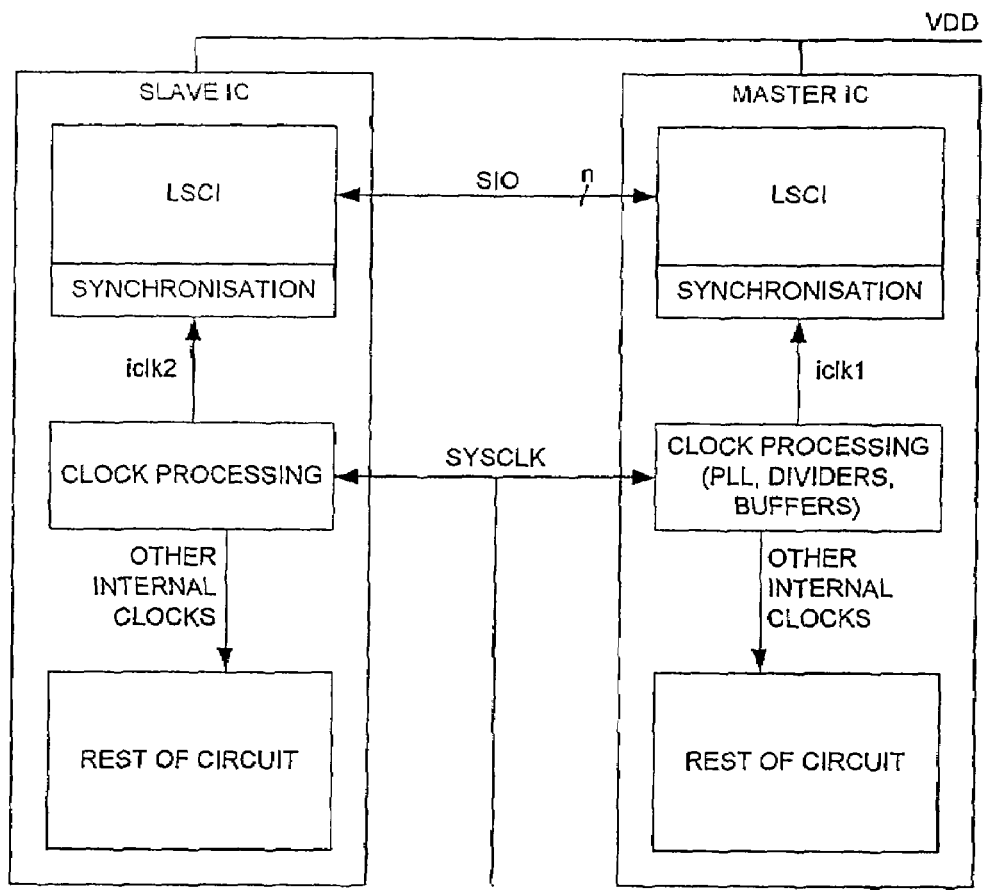
FIG. 4 shows schematically a possible implementation of the invention.

In FIG. 4 the transmitting master IC and the receiving slave IC both receive a "low swing" system clock signal SYSCLK, which is processed internally in each of the integrated circuits. The processing may include amplification and regeneration of a proper waveform for further use in the respective integrated circuits. Regenerated internal clock signals iclk1 and iclk2, respectively, are supplied to interface circuits in the respective integrated circuits. The interface circuits are referred to as low swing clocked interfaces, LSCI. Data are exchanged between the master IC and the slave IC in one or both directions via a serial input/output (SIO) bus with n lines. The protocol used may support multi-slave architectures.

Figure 5:
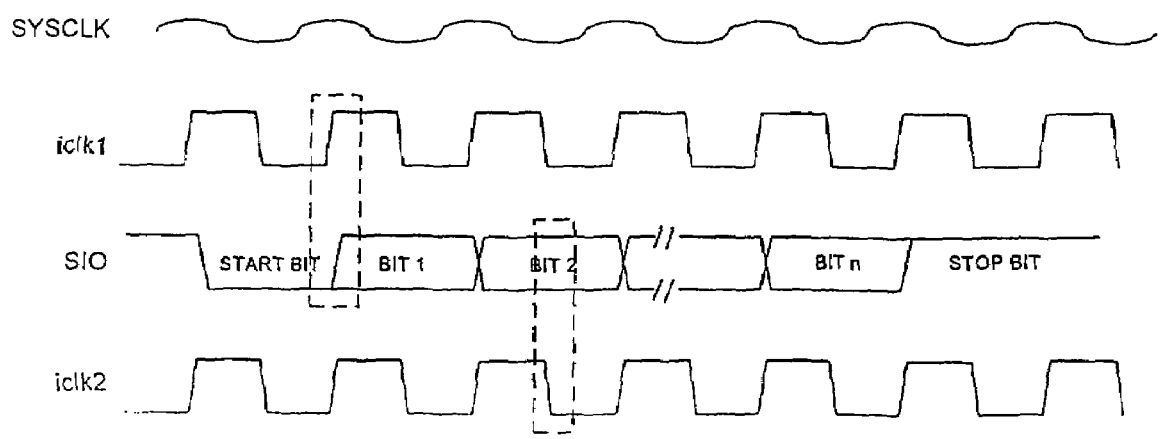
FIG. 5 shows schematically an example of the signal waveforms in the system shown in FIG. 4.

FIG. 5 shows the signal waveforms in the system in FIG. 4. The signal waveforms are not necessarily drawn to the same amplitude scale. The system clock signal SYSCLK is a "low swing" clock signal. Two clock signals iclk1 and iclk2 regenerated from the external low swing SYSCLK can be used to perform a data transfer protocol on a bi-directional line(s) SIO. In the master IC the rising edge of the internal clock iclk1 is used to generate data, and in the slave IC the falling edge of the internal clock iclk2 is used to sample data. Such a protocol, where data is generated by the transmitter at one edge of iclk1 and is sampled by the receiver on the other clock edge of iclk2 is quite common. In the example shown in FIG. 5 the system clock resembles a sine wave signal and can in fact be a sine wave signal. The system clock signal SYSCLK has no steep edges and no abrupt changes between its high and low levels and thus contains much less higher harmonics than a traditionally used square wave signal. Also, the amplitude of the system clock signal SYSCLK is smaller than the amplitudes of the regenerated internal clock signals iclk1 and iclk2.

Basically, iclk1 and iclk2 are independent. Different types of clock processing and/or different implementation technology of the two integrated circuits may cause the regenerated internal clock signals iclk1 and iclk2 may have a considerable phase difference, which is also referred to as "skew", which may have to be compensated for. If the skew is deterministic, it is possible to run the serial interface at the same speed or frequency as the system clock. If the skew is unknown or difficult to estimate, it is preferred to clock the data channel at a clock frequency lower than the system clock, preferably lower than half the frequency of the system clock.

Low swing clocked interfaces according to the invention allow synchronization methods as used in asynchronous buses. Receiver sampling of data may be automatically synchronized. In principle, the receiver does not know when transmission is started, and the receiver samples the serial input/output (SIO) line, until the first transition signifying a bit is recognized, whereafter the receiver samples the data stream with the defined data rate frequency. When the maximum data rate is low compared to the system clock, it is possible to introduce a multi-sampling circuit, whereby each data bit is sampled several times, and an average is calculated between the sampling points to determine the value of the data bit.

Although only serial data interfaces have been described, it will be clear that the invention can also be used in connection with parallel data interfaces with corresponding advantages.

It is seen that the system interfaces in FIGS. 2 and 3 require fewer pin connections on the integrated circuits relative to the prior art system in FIG. 1. This is an advantage.

Clock lines like the ones shown can be a source of EMI, because the lines may act as antennas radiating electromagnetic signals at high frequencies, in particular at higher harmonics of the clock frequency. "Low swing" signals in general, and "low swing" clock signals in particular, have a reduced content of higher harmonics, whereby the problem of EMI is correspondingly reduced.

Further, electromagnetic interference (EMI) is reduced drastically in systems comprising fewer "full swing" digital signals. An abrupt signal transition from one level to another creates short and steep current pulses not only on the signal lines but also on the power supply lines. Such current pulses have a significant high frequency content, which may cause disturbances, not only locally but the disturbances may spread via power supply lines to other circuits, which may thereby become noise infected. Using "low swing" clock signals on the clock lines instead of "full swing" clock signals reduces this problem.

Also, since "low swing" signals have reduced amplitude relative to traditional "full swing" signals, they are less power consuming.

In commercial systems, low swing clocked interfaces (LSCI) are estimated to be operable with clock frequencies in the range from 1 to 50 MHz with data rates from 0.5 to 25 Mbit/s. Below this range asynchronous buses may be preferred since an additional clock is saved.

In systems where simplicity is required, low swing clocked interfaces (LSCI) are well suited. Simplicity in design also means simplicity in system verification, which in turn leads to shorter time to market. Also, simple systems are less liable to failure and less vulnerable than more complicated systems.

Low swing clocked interfaces have benefits for applications where low power dissipation and low costs are of importance. Typical anticipated applications include cellular and cordless systems, global positioning system (GPS) receivers, laptop computers, personal digital assistants (PDA), and Bluetooth transmitters and receivers.

The invention claimed is:

1. A system comprising:
   a transmitter capable of transmitting digital data,
   an interface connected to the transmitter, the interface having at least one data line for receiving and transmitting the digital data from the transmitter, and a clock line for transmitting a clock signal,
   a clock circuit for supplying, to the clock line, the clock signal alternating between two signal levels at a predetermined frequency, the two signal levels effecting a low swing to mitigate the generation of electromagnetic interference EMI, thereby providing timing information,
   a receiver connected to the interface so as to receive, from the interface, the digital data transmitted on the data line, and so as to receive the clock signal on the clock line,
   characterized in that the receiver regenerates an internal clock signal derived from the received clock signal and the receiver uses the clock signal received from the clock line for deriving the timing information for processing the received digital data.

2. A system according to claim 1, characterized in that the clock circuit for supplying the clock signal to the clock line is included in the transmitter.

3. A system according to claim 2, characterized in that the receiver receives, as the only clock signal, the clock signal transmitted by the transmitter.

4. A system according to claim 1, characterized in that the clock circuit for supplying the clock signal to the clock line is a clock signal generator external to the transmitter.

5. A system according to claim 1, characterized in that the transmitter and the receiver both receive a power supply voltage (VDD) and the two signal levels of the clock signal have a voltage difference that is less than the VDD.

6. A system according to claim 1, characterized in that
the receiver is also capable of transmitting digital data,
the data line is capable of receiving and transmitting the digital data from the receiver, and the transmitter is capable of receiving the digital data from the interface.

7. A system according to claim 1, wherein the transmitter and the receiver both receive a power supply voltage (VDD) and the two signal levels of the clock signal have a voltage difference that is less than half of the VDD.

8. A system according to claim 1, wherein the clock signal is a sine wave signal to mitigate the generation of EMI.

9. A system according to claim 1, wherein the clock signal is a sine wave signal to mitigate the generation of EMI, the transmitter and the receiver both receive a power supply voltage (VDD), and the two signal levels of the clock signal have a voltage difference that is less than the VDD.

10. A system according to claim 1, wherein the clock signal is a sine wave signal to mitigate the generation of EMI, the transmitter and the receiver both receive a power supply voltage (VDD), and the two signal levels of the clock signal have a voltage difference that is less than half of the VDD.

11. A system according to claim 1, wherein the clock line does not transmit digital data.

12. A system according to claim 1, wherein the internal clock signal is regenerated by reshaping the received clock signal from a sine wave signal into a square wave signal and by amplifying the received clock signal.

13. A system comprising:

a transmitter to transmit digital data;

an interface connected to the transmitter, the interface having at least one data line for receiving and transmitting the digital data from the transmitter, and a clock line for transmitting a clock signal;

a clock circuit to supply a low swing clock signal to the clock line thereby providing timing information, the low swing clock signal alternating between two signal levels at a predetermined frequency, the two signal levels having a voltage difference that is less than one half a power supply voltage (VDD);

a receiver connected to the interface to receive the digital data transmitted on the data line and to receive the low swing clock signal on the clock line as the only clock signal for deriving the timing information for processing the received digital data, the receiver further receives the power supply voltage (VDD) and amplifies and reshapes the received low swing clock signal to thereby regenerate a usable internal clock signal.

14. The system of claim 13, wherein the low swing clock signal mitigates generation of electromagnetic interference EMI.

* * * * *